March 29, 1966  A. B. BLACKBURN  3,243,658
ELECTRONIC VOLTAGE DETECTION AND PROTECTION DEVICE
Filed July 21, 1965
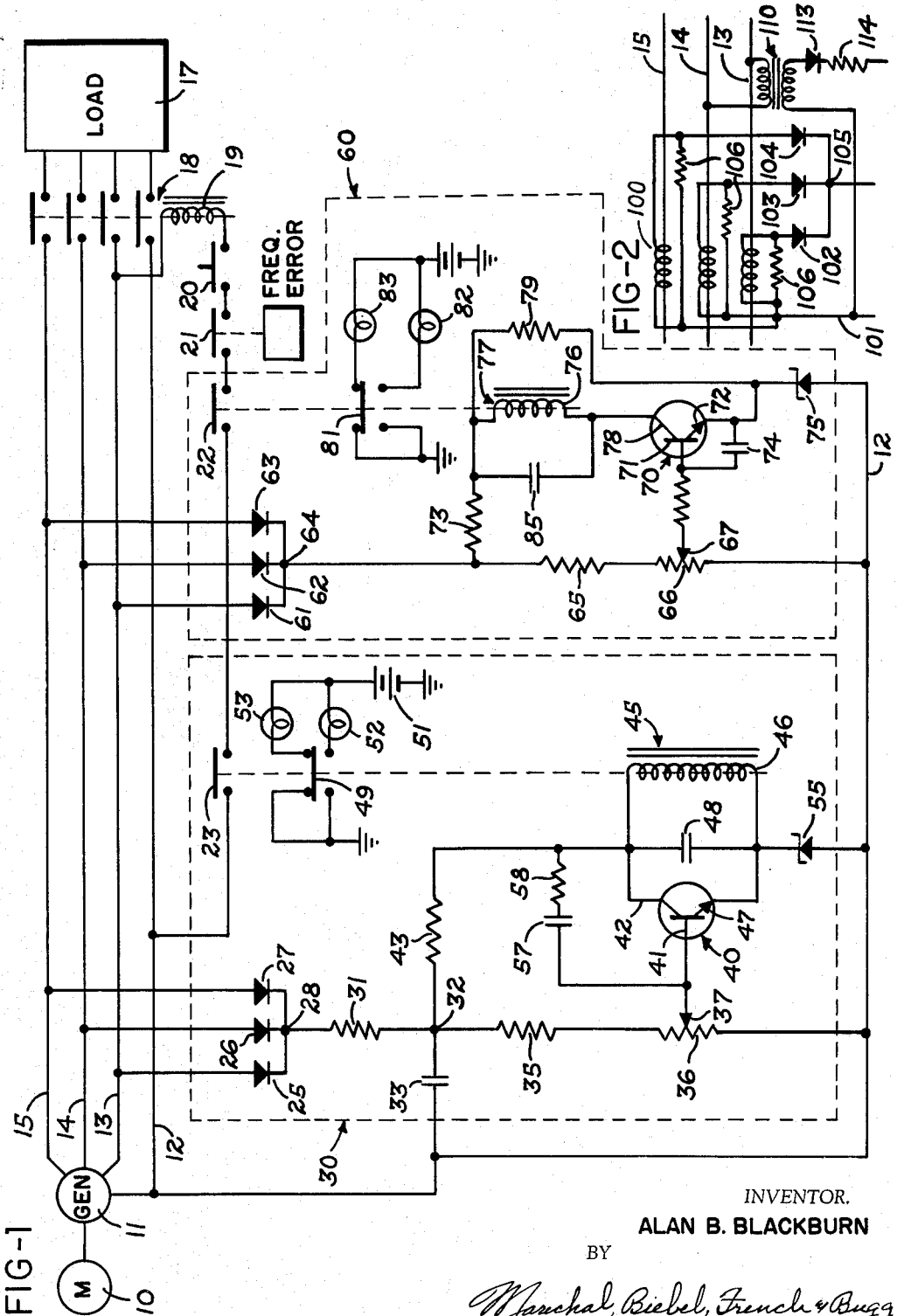
INVENTOR.
ALAN B. BLACKBURN
BY
Marchal, Biebel, French & Bugg
ATTORNEYS United States Patent Office 3,243,658
Patented Mar. 29, 1966

3,243,658
ELECTRONIC VOLTAGE DETECTION AND
PROTECTION DEVICE
Alan B. Blackburn, Troy, Ohio, assignor to Hobart
Brothers Company, Troy, Ohio, a corporation of Ohio
Filed July 21, 1965, Ser. No. 473,792
7 Claims. (Cl. 317—31)

This application is a continuation-in-part of applications Serial No. 202,913, filed June 15, 1962, and Serial No. 266,149, filed March 15, 1963, both cases now abandoned.

This invention relates to an electronic voltage detection and protection device for controlling the output circuit of a power supply.

The novel apparatus of this invention is particularly useful in controlling the output circuit of a ground power unit used in supplying power to an aircraft. These ground power units are normally a motor driven generator which supplies the electrical power necessary to run equipment in an aircraft in the absence of the aircraft's own power supply. In order to prevent damage to the expensive aircraft equipment, it is necessary to insure that the voltage output of the ground power unit is held between certain allowable limits. It is particularly important that the voltage output of the motor generator never exceeds, except for brief periods, a predetermined upper voltage limit although some minor variations in voltage level are allowable.

In prior art voltage controlled circuits, it has been the practice to utilize voltage sensitive relays to control the output of a power supply unit. These voltage sensitive relays, however, are both expensive and sensitive to external conditions such as weather, shock and vibration. The novel control circuit of this invention eliminates the necessity for acquiring voltage sensitive relays by utilizing a transistor amplifier in combination with a relay of nominal sensitivity. The use of such a transistor amplifier increases, therefore, the sensitivity of the relay by an amount equivalent to the gain of the amplifier.

It is therefore an object of this invention to provide a sensitive protection circuit for the output of a power supply which eliminates the need for sensitive relays by utilizing a transistor amplifier in combination with a relay of nominal sensitivity.

It is another object of this invention to provide a miniaturized protection circuit which is capable of operating under adverse environmental conditions.

It is another object of this invention to provide a voltage detection and protection device which responds to the voltage output of a power supply to control the output circuit of such power supply.

A further object of this invention is to provide an adjustable overvoltage detection and protection device responding with an inverse time delay characteristic to voltages which momentarily increase above a predetermined level.

It is a further object of this invention to provide an adjustable under-voltage detection and protection device responsive to the average voltage output of a power supply to control the output circuit of such power supply.

These and other objects and advantages of this invention will be apparent from the following description, the accompanying drawing and the appended claims.

In the drawing:
FIG. 1 is a schematic representation of the under-voltage and over-voltage detector constructed according to this invention controlling the output circuit of an aircraft ground power unit; and
FIG. 2 is a schematic diagram showing how the present invention can also be connected to the output circuit to provide for current control rather than voltage control.

Referring now to the drawing, and particularly to FIG. 1, which shows a preferred embodiment of this invention associated with the output circuit of a ground power unit used in supplying power to an aircraft, the motor or prime mover 10, which may be either an electric motor or an internal combustion engine, is shown driving a generator 11. The output of the generator 11 may be a three phase power line having a neutral line 12 and three output lines 13, 14 and 15. The load 17 is shown connected to the output of the generator through the contacts of circuit breaker 18.

Power to energize the coil 19 of circuit breaker 18 is derived by connecting one end of the coil to neutral line 12 and the other end of the coil to any of the output lines 13, 14 or 15. In series with the coil 19 are several switch contacts including a manual on-off switch 20, switch contacts 21 associated with a frequency error control circuit, such as that described in the copending application of Alan B. Blackburn, Serial No. 226,209, filed September 24, 1962, now abandoned, and replaced by continuation application Serial No. 493,997, filed October 8, 1965, switch contact 22 associated with the under-voltage detection and protection circuit of this invention, the operation of which will be described later in detail, and switch contact 23 associated with the over-voltage detection and protection circuit of this invention.

Turning now to the specific over-voltage detector circuit of this invention, there is shown a series of three diode rectifiers 25, 26 and 27, connected to the three output lines 13, 14 and 15, respectively, and having their cathodes joined at a common junction 28. The direct current potential of this junction is an indication of the voltage of the power line. Therefore, this potential at junction 28 will rise if the voltage in any of the lines 13, 14 and 15 increases with respect to the neutral line 12.

The over-voltage protection and control circuit is shown generally at 30. Connected between junction 28 and junction 32 is a surge control resistor 31. Capacitor 33 is connected between the neutral line 12 and junction 32 and becomes charged by the pulses of current from the diode rectifiers 25, 26 and 27 through resistor 31. The capacitor 33 will become charged to and store the potential of the highest or peak voltage pulse from any of diodes 25, 26 and 27. In an alternative embodiment, when the average value of the voltages on the output lines is to be sensed, capacitor 33 may be eliminated and the other circuit values modified accordingly. For purposes of monitoring the upper allowable voltage output of the power supply, however, it is preferred to measure the peak voltage of the power supply output.

Connected between junction 32 and neutral line 12 is a voltage divider means including resistor 35 and a potentiometer 36. Since standardized values of potentiometers are readily available and since a low value potentiometer will give better control over the voltage appearing at the adjustable tap 37, the addition of resistor 35 is necessary to adjust the total resistance value of this circuit to a suitable value compatible with the expected voltage range of the output lines at which this detector circuit may be attached.

The circuit thus described may be modified by adding a capacitor between the junction of resistor 35 and potentiometer 36 and neutral line 12. This capacitor would aid in eliminating ripples from successive direct current pulses and render the detector circuit more responsive to the actual average value of successive direct current pulses.

The adjustable tap 37 on the potentiometer 36 is connected to the base 41 of transistor 40. The collector 42 is connected to junction 32 through resistor 43 which in turn determines the potential on the collector. The coil 46 of relay 45 is connected between the emitter 47 and collector 42 of transistor 40. Thus, the current through relay coil 46 is determined by the voltage across the emitter-collector path of the transistor. The capacitor 48 across the relay coil 46 prevents relay chatter. Relay 45 operates the contacts 23 in the power line of circuit breaker 18 as well as contact blade 49 in the signalling circuit.

Contact blade 49 governs alternately the current supply from a battery or any other suitable voltage source 51 to either signal lamp 52 or signalling lamp 53. Lamp 52 may, for example, be green, while lamp 53 may be red.

The emitter 47 of transistor 40 is connected through a Zener diode 55 to the neutral line 12. This Zener diode provides a constant voltage reference for the transistor 40. Zener diode 55, resistor 43 and the parallel connection of the transistor 40 and the coil 46 of relay 45 define a shunt path across terminal 32 and the neutral line 12.

A feed back capacitor 57 interconnects the collector 42 and the base 41. This capacitor 57 provides for a negative transient feed back path to the base to give any change in the collector potential relative to the potential an inverse time delay characteristic.

In operation, the device thus far described operates in the following manner. Assuming that the line voltage initially is below a predetermined over-voltage level, the closure of manual switch 20 will cause relay circuit breaker 18 to energize and supply the output voltage from generator 11 to the load 17. The adjustable tap 37 of potentiometer 36 is adjusted so that the voltage drop between it and neutral line 12 is not larger than the voltage drop across the Zener diode 55. In this case, the potentials at junction 32 and on the adjustable tap 37 are such that the transistor 40 is at cutoff. Zener diode 55 may be somewhat below the Zener break-through voltage level thus acting as a high ohmic resistor. However, it is preferred that Zener diode 55 is already at its constant voltage level and thus biases the emitter 47 at a constant voltage potential.

With transistor 40 at cutoff, the current through Zener diode 55 flows exclusively through the coil 46 of relay 45. This current is sufficiently high to energize relay 45 thus assuring that switch contacts 23 are closed and that contact blade 49 completes the circuit through signal lamp 52 so that a normal operating condition is indicated.

It should be mentioned that for this protective device as described, it is of advantage to operate with the relays energized under normal operating conditions so that in case of failure of any kind the relay will open, thus indicating an equipment malfunction, and at the same time remove the power from the load 17.

For reasons of simplicity the function of capacitor 57 shall first be disregarded and the description of the operation will proceed on the basis of assuming that a steady state or a slowly rising voltage change occurs in output lines of the generator 11.

Assuming now that the voltage on any or all of the lines 13, 14 and 15 increases, the rectified voltage between junction 32 and the neutral line 12 will also increase by a proportionate amount. Accordingly, the current in the series circuit defined by resistor 35 and potentiometer 36 will increase. Hence, the potential at the adjustable tap 37 with respect to the neutral line 12 will increase. Since the emitter 47 is at a potential with respect to neutral line 12 that is constant and is defined by the voltage across the Zener diode 55, an increase in voltage at the adjustable tap 37 to a value above that on the emitter 47 will cause the transistor to become conductive. It will be appreciated that the particular voltage level at junction 28 which causes the transistor 40 to conduct may be adjusted by the positioning of the adjustable tap 37 on the potentiometer 36 so that a deviation in the power supply voltage by an amount predetermined by the setting of the potentiometer will cause the transistor, or voltage sensing means, to conduct.

Since the transistor can also be considered as constituting a controllable impedance, in this case being shunted by the relay coil 46, and since current conduction of the transistor 40 results in a collector current superimposed upon resistor 43, the collector voltage drops so that the relay 45 is deenergized. In other words, conduction of transistor 40 in effect shorts out the relay coil 46. When the relay 45 deenergizes, the contact blade 49 is shifted in position and completes the current through lamp 53, indicating an over-voltage condition. At the same time, switch contact 23 is opened, interrupting the current through coil 19 of circuit breaker 18, thereby isolating the load 17 from the generator 11. If the over-voltage in any of the lines 13, 14 and 15 increases still further, resistor 43 acts as a protective limiting resistor for the Zener diode 55, since the voltage dropped across the Zener diode does not increase.

When the voltage on the output lines 13, 14 and 15 decreases, the transistor 40 will again be cut off when the critical response level is reached as determined by the position of the adjustable tap 37. When transistor 40 again cuts off, relay 45 is again energized and completes the circuit through the circuit breaker coil 19 and through the indicator light 52.

Under steady state or slowly changing voltage conditions, the voltage across capacitor 57 is determined by the direct current conditions of the circuit. In the case of a transient or rapid line voltage increase, condenser 57 will act as an integrater or time delay means and prevent the immediate operation of the voltage sensing circuit. As the voltage on the base rises past the point where conduction through the transistor begins, the voltage on the collector will start to decrease, since a small change in voltage at the base will cause a large change in current through the collector, and will cause a large voltage drop across resistor 43. The change in voltage of the collector will be reflected through capacitor 57 and tend to decrease the voltage on the base. The rate at which the collector voltage changes is then determined by the value of the time delay capacitor 57.

Even though the transistor starts to conduct, the relay 46 will not be deenergized since the current through the transistor at the start of conduction is not large enough to shunt the coil 46. Once the transistor reaches full conduction, however, the coil 46 is effectively shorted and the relay 45 will deenergize. Therefore, in the case of a short term, rapid voltage increase on the output lines, relay 45 will not immediately deenergize in spite of the fact that the potential at junction 32 may have risen above the first predetermined voltage level at which, under steady state conditions, the transistor would have gone into full conduction.

In the improved embodiment of the over-voltage detector as described above, the over-voltage detector may be designed to open the circuit at a first predetermined level of about 130 volts during steady state or slowly rising voltage conditions. In the case of a step rise voltage, however, the value of capacitor 57 is selected so that a time delay will occur before the transistor 40 conducts. For example, a step rise in voltage from 120 to 130 volts will cause the transistor to conduct about three seconds after the change in voltage has occurred. On the other hand, the circuit is designed to always open the output circuit of the generator in the event that the output line voltage exceeds a second predetermined level of about 150 volts, regardless of whether this value is achieved through a slowly rising voltage or through a rapid change in voltage.

The value of the second predetermined voltage level can be adjusted by selecting an appropriate value for the resistor 58 which is shown in series with the feed back capacitor 57. For small values of resistance, an increase in the resistance of resistor 58 will have more effect on the value of the second predetermined voltage level, the voltage level at which the transistor conducts immediately, than it does on the time delay characteristics of the circuit. In some applications, it may be more desirable to include a choke or inductance in series with the feed back capacitor 57 in order to adjust the value of the second predetermined voltage. The use of a choke is particularly desirable in situations where extreme fast transient voltages occur. In addition, the use of a choke or inductor gives a broader range of voltages which can be selected for the second predetermined voltage level without requiring a change in the value of capacitor 57.

The under-voltage detector portion of the protective circuit is shown generally at 60. A voltage averaging means including a series of three diode rectifiers 61, 62 and 63 is shown having their anodes connected to output lines 13, 14 and 15, respectively, and having their cathodes joined to a common junction 64. Thus, the direct current voltage between junction 64 and the neutral line 12 represents the average value of the voltage appearing on the output lines. Connected between the junction 64 and the neutral line 12 is a voltage divider means including resistor 65 and potentiometer 66.

The adjustable tap 67 on the potentiometer 66 is connected to the base 71 of transistor 70. The emitter 72 is connected to a Zener diode 75, the other end of which is terminated at the neutral line 12. The resistor 73 connects terminal 64 to one side of relay coil 77. The other side of the relay coil is connected to the collector 78 of the transistor 70. A further resistor 79 interconnects the junction between the resistor 73 and relay coil 76 with the emitter 72. Resistors 73 and 79 are selected so that at substantially normal voltages, and even though a substantial voltage decrease may occur, the current flowing through Zener diode 75 is such that a constant voltage is available on the emitter 72. Thus, notwithstanding any variation of voltage at terminal 64, the emitter will remain at a constant voltage level.

Switch contact 22 of relay 77 is positioned in the circuit in series with coil 19 of circuit breaker 18, as previously described. Contact blade 81 completes the circuit of either of signal lights 82 or 83 so that an indication of the condition of this relay may be observed. A capacitor 85 is connected parallel to the relay coil 76 to remove ripples and prevent contact chatter.

In operation, the adjustable tap 67 of potentiometer 66 is adjusted to render the transistor 70 normally conductive. That is to say, that at normal line voltage and within a certain range below the normal line voltage, the current through the resistive path including resistor 65 and potentiometer 66 is so large that the voltage drop between adjustable tap 67 and the neutral line 12 is larger than the constant voltage drop across Zener diode 75. Accordingly, the base electrode 71 is positively biased with respect to the emitter 72, permitting electric current to flow.

It will be appreciated that for normal line voltage conditions as represented by particular voltage at junction 64, there is a particular range of positions of the adjustable tap 67 in which transistor 70 will be conductive. If the adjustable tap is moved so as to decrease the potential difference between the neutral line 12 and the tap 67, the tap will reach a position at which the transistor 70 will stop conduction or cut off. Thus, the relationship between potentiometer adjustment and the voltage between a junction 64 and the neutral line 12 determines when transistor 70 is cut off and when it is conductive, since the base current determines and defines the cut off state regardless of collector voltage. At any given position of tap 67, the voltage between junction 64 and the neutral line 12 controls the conduction and cut off of the transistor 70. Therefore, deviation in the power supply voltage by an amount predetermined by the setting of the tap 67 will cause the transistor to cut off.

Since it is desired to open the output line of the power supply when the line voltage falls below a particular, usually critical voltage, the tap 67 is adjusted so that at the corresponding representative voltage between junction 64 and the neutral line 12, the changeover occurs from transistor conduction to cut off. This voltage, also called, the first response voltage, will be, of course, somewhat below the normal operating line voltage so that the difference between the line voltage, normal voltage level and the first response voltage will determine the range of tolerance for the transistor 70, that is, its response to a line voltage decrease by changing its state of conduction.

Conduction of transistor 70 means that there is a current flow in the collector circuit through relay coil 76 of relay 77. As long as this current is sufficient to energize the relay, switch contacts 22 will be closed and contact blade 81 will direct current through signal lamp 82.

The voltage drop across resistor 73 determines the positive collector voltage on transistor 70. With decreasing line voltage the collector voltage will also decrease. However, due to the inherent control characteristics of transistor 70, the collector current is substantially independent from the collector voltage in the range of small base currents, that is, while in the conductive state, but near cut off.

The energization of relay 77 depends substantially on the collector current. This collector current at which the relay will be deenergized is not necessarily as low as the collector current for zero base current, but it may be somewhat higher depending on the sensitivity of the relay. Thus, deenergization of relay 77 will occur at a collector current corresponding to a voltage at junction 64 somewhat between the normal line voltage and the first response voltage. This voltage at which the relay is deenergized is called the second response voltage.

It will be apparent that by utilizing a highly sensitive and expensive relay, first and second response voltages could be utilized for directly operating the relay. Such an arrangement, however, is extremely expensive and the relays are delicate and can readily be damaged by abuse. According to the present invention, the need for such expensive and highly sensitive relay is eliminated, and instead, a relatively inexpensive, less sensitive relay can be employed with substantially the same results by utilizing the transistorized amplifying circuit of this invention.

The adjustable tap 67 of potentiometer 66 is adjustable for determining the second response voltage so that the relay will open its contacts at the proper voltage. The first voltage will, of course, be somewhat dependent on the setting of the adjustable tap 67, but further control of the relationship between the first response voltage and the second response voltage can be arrived at by modifying the gain of the transistor or the sensitivity of the relay.

The gain of the transistor can be modified, for example, by including a resistor 87 between the base 71 and the adjustable tap 67 or by connecting a resistor between the collector and the base. The reduction in the gain of the transistor will increase the voltage between the first response voltage and the second response voltage.

Under normal line voltage conditions, transistor 70 is conducting and the switch 22 is closed, completing the circuit through the circuit breaker coil 19 while the contact blade 81 completes the circuit through the signal lamp 82 which indicates normal operating conditions. If the line voltage on output lines 13, 14 and 15 should decrease, there will be a proportionate decrease in voltage at junction 64.

As the line voltage decreases, the voltage on the base of transistor 70 will also decrease, and when this voltage reaches the second response voltage the relay coil is deenergized. This will open the switch contact 22 and cause circuit breaker 18 to remove the line voltage from the load 17. At the same time, contact blade 81 will cause the circuit through signal lamp 83 indicating an under-voltage condition.

If desired, this under-voltage detector 60 may also be provided with a time delay circuit so that rapidly changing or transient voltages on the output lines 13 through 15 will not immediately cause the relay 75 to operate. This time delay feature can be accomplished by adding a capacitor 74 between the emitter and base of transistor 70. With such a capacitor in the circuit, a rapid change in line voltage will not cause the relay to deenergize until the base voltage has reached the second response level in the time determined by the value of the time delay capacitor 74. This feature is especially important when the under-voltage detector is used on single phase output line.

It is again noted that during normal operation, both the relay 46 in the over-voltage circuit and relay 77 in the under-voltage circuit are energized. Failure of either of these relays will cause the voltage to be removed from the circuit breaker coil 19 and isolate the load 17 from the output line of the generator 11. Therefore, a fail-safe characteristic is inherently provided by this invention.

Various modifications of the circuits described above are available. For example, the voltage source for the collectors in either the over-voltage or the under-voltage circuits could be provided by a separate power source. It is also contemplated that the relay in the under-voltage detector, for example, could be placed across the emitter and collector elements of the transistor 70, in a manner similar to that described for the over-voltage detector, while utilizing the normally closed contacts of the relay for the signalling and control function of the circuit.

A further modification would be to employ PNP type transistors rather than NPN type transistors shown and described above. Appropriate modifications in the circuit, including a reversal in polarity of the Zener diodes, would, of course, be necessary. It is also contemplated that the Zener diode could be replaced with any constant voltage biasing element such as a glow discharge tube. It is also contemplated that rather than opening the circuit in the output lines of the generator 11, the load could be protected by opening the ignition circuit to the motor 10, in the case where an internal combusion engine is used. In the case of an electro motor driving the generator 11, the input circuit to the motor could be opened to protect the load.

Reference is now made to FIG. 2 which shows a modification wherein the present invention can be utilized as a current monitoring device rather than as a line voltage detecting device. In this embodiment, a current transformer 100 having windings inductively coupled to each of the output lines 13, 14 and 15 produces a voltage proportional to the current through these lines. One end of each of the windings is connected to a common line 101 which forms the ground or neutral line for the detection circuits. Rectifiers 102, 103 and 104 are connected to the other end of the transformer windings and have their cathodes connected to a common junction 105. The individual windings of the transformer 100 are shunted by load resistors 106 for reasons of stabilization.

Since the voltage at junction 105 depends on the current through the output lines 13, 14 and 15, it is necessary to supply a separate voltage source for the operation of both the voltage sensing transistor and the switching relay. This may be done by connecting the primary winding of the transformer 110 across the output lines 13 and 14, rectifying the output of the secondary winding by rectifier 113 and passing the current through load resistor 114 to the relay coil and collector of the voltage detecting circuit. The voltage at junction 105 would then be divided and applied to the base of the voltage sensing transistor in the manner as previously described.

In addition to monitoring the current in the output lines 13, 14 and 15 by a current transformer, it is also possible to use a set of resistors placed in series in the output line while measuring the voltage developed across these resistors as an indication of the current flow, although the use of a current transformer gives better voltage regulation on the output.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An electronic voltage detection and protection device for controlling the output circuit of a power supply in response to the voltage output of said power supply, said device comprising a voltage sensing means operably connected to the output of said power supply for providing an output when the actual value of the normal steady state voltage output of said power supply deviates from a desired value by a first predetermined amount and when the value of any transient voltage output of said power supply deviates from said desired value by a second predetermined amount, said voltage sensing means including a voltage divider means having an adjustable output connected across the output circuit of said power supply and a transistor operably connected to the output of said voltage means, said voltage divider means supplying voltage to the base of said transistor to normally bias said transistor for conduction and adjusted so that a decrease in the average power supply voltage by a first predetermined amount will cause said transistor to cut off, time delay means included in said voltage sensing means for preventing the immediate operation of said voltage sensing means upon the occurrence of transient voltages exceeding said first predetermined value but not exceeding said second predetermined value, and control circuit means in the output line of said power supply actuated by the output of said voltage sensing means, said control circuit means including a relay in series with the collector circuit of said transistor to open said output line when the steady state voltage on said output line deviates from said desired value by said first predetermined amount and when any transient voltage on said power supply deviates from said desired value by said second predetermined amount.

2. An electronic voltage detection and protection device for controlling the output circuit of a power supply in response to the voltage output of said power supply, said device comprising means for storing a voltage representing the peak value of said power supply, voltage sensing means operably connected to the output of said storage means for providing an output when the actual value of the normal steady state voltage output of said power supply deviates from a desired value by a first predetermined amount and when the value of any transient voltage output of said power supply deviates from said desired value by a second predetermined amount, said voltage sensing means including a voltage divider having an adjustable output connected across said peak voltage storing means and a transistor operably connected to the output of said voltage divider means, said voltage divider means supplying a voltage to the base of said transistor to normally bias said transistor at cut off and adjusted so that an increase in the peak power supply voltage by a first predetermined amount will cause said transistor to conduct, time delay means included in said voltage sensing means for preventing the immediate operation of said voltage sensing means upon the occurrence of transient voltages exceeding said first predetermined amount but not exceeding said second predetermined amount, and control circuit means in the output line of said power supply actuated by the output of said voltage sensing means, said control circuit means including a relay connected across the emitter and collector elements of said transistor to open said output line when the steady state voltage on said line deviates from said desired value by said first predetermined amount and when any transient voltage on said power supply deviates from said desired value by said second predetermined amount.

3. An electronic voltage detection control device for controlling the output circuit of a power supply in response to the voltage output of said power supply to open the power supply output circuit when the voltage level decreases below a lower predetermined value and to open said circuit if the steady state voltage level increases above a first upper predetermined value or when any transient voltage increases above a second upper predetermined value, said device comprising, means for storing a voltage representing the peak output value of said power supply, first voltage sensing means operably connected to said storage means for providing an output when the steady state peak value of the voltage of said power supply exceeds a first upper predetermined voltage level and when the value of any transient voltage on said power supply exceeds a second predetermined voltage level, time delay means included in said voltage sensing means for preventing the immediate operation of said voltage sensing means upon the occurrence of transient voltages exceeding said first predetermined level but not exceeding said second predetermined level, means for providing a voltage representing the average output value of said power supply, second voltage sensing means operably connected to said averaging means for providing an output when the value of the voltage on said averaging means falls below said lower predetermined value, and control circuit means in the output line of said power supply actuated by the output of said first voltage sensing means to open the output line of said power supply when the steady state value of the voltage of said power supply exceeds said first upper predetermined level or when any transient voltages of said power supply exceeds said second predetermined level, said control means being further actuated by the output of said second voltage sensing means to open said output line of said power supply when the value of the voltage of said power supply falls below said lower predetermined value.

4. An electronic voltage detection and protection device for controlling the output circuit of a power supply in response to the voltage output of said power supply, said device comprising means for storing a voltage representing the peak output value of said power supply, voltage sensing means operably connected to said storage means for providing an output when the steady state peak value of the voltage on said storage means exceeds a first predetermined voltage level and when the value of any transient voltage on said storage means exceeds a second predetermined voltage level, time delay means included in said voltage sensing means for preventing the immediate operation of said voltage sensing means upon the occurrence of transient voltages exceeding said first predetermined level but not exceeding said second predetermined level, and a control circuit means in the output line of said power supply actuated by the output of said voltage sensing means to open the output line of said power supply when the steady state value of the voltage on said storage means exceeds said first predetermined level or when a transient voltage on said storage means exceeds said second predetermined level.

5. An over-voltage detection and protection device for controlling the output circuit of an alternating current power supply in response to the voltage output of said power supply, said device comprising a rectifier for converting the alternating current line voltage to a direct current voltage proportional to the value of said line voltage, means, including a capacitor, for storing the peak direct current value of said rectified line voltage, a constant voltage reference, voltage divider means placed across the output of said peak storage means including the potentiometer having an adjustable tap, a voltage sensing means connected between said constant voltage reference means and said potentiometer tap for providing an output when the steady state value of the voltage on said storage means rises above a predetermined voltage level, means in said voltage sensing means forming a time delay circuit to prevent immediate operation of said sensing means upon the occurrence of transient voltages above a first predetermined voltage level but below a second predetermined voltage level, and a control circuit in the output of said alternating current power supply actuated by said voltage sensing means to open the output of said power supply when the steady state voltage on said storage means rises above said first predetermined voltage level or when any transient voltages on said storages means rises above said second predetermined voltage level.

6. An under-voltage sensing and signalling device for controlling the voltage on an alternating current electrical power line comprising, rectifier means for deriving a direct current voltage proportional to the alternating current voltage on said power line, the output of said rectifier means terminated in direct current terminals, a first resistor means including a potentiometer connected in series across said terminals and a movable contact on said potentiometer, a transistor including base, emitter and collector elements, said base being connected to said movable contact on said potentiometer, a constant voltage biasing means placed in series between the emitter of said transistor and one of said terminals of said rectifier means, said emitter also being connected to the other said terminal of said rectifier means through a second and third resistor, said movable contact being adjusted so that the voltage imposed on the base of said transistor causes the transistor to conduct during periods of normal alternating current voltage on said electrical power line and causes the transistor to cut off when alternating current electrical power line has an under-voltage condition, a relay including a control coil and a relay switch for controlling the output of said alternating current electrical power line, said coil of said relay being connected between the collector of said transistor and the junction between said second and third resistors, and a signal and control device operated by said relay switch, said control device including a switch means in said alternating current electrical power line to open said power line during periods of under-voltage condition on said power line.

7. An over-voltage sensing and signalling device for controlling the output on an alternating current electrical power line comprising, rectifier means for deriving a direct current voltage proportional to the alternating current voltage on said power line, means for storing a voltage representing the peak output voltage of said power line, the output of said storage means terminated in direct current terminals, a first resistor means including a potentiometer connected in series across said terminals and a movable contact on said potentiometer, a transistor including base, emitter and collector elements, said base being connected to said movable contact on said potentiometer, a constant voltage biasing means placed in series between the emitter of said transistor and one of said terminals of said rectifier means, said movable contact being adjusted so that the voltage imposed on the base of said transistor causes the transistor to be cut off during periods of normal alternating current voltage on said electrical power line and causes the transistor to conduct when alternating current electrical power line has an over-voltage condition, a relay including a control coil and a relay switch for controlling the output of said alternating current electrical power line, said coil of said relay being connected in the collector circuit of said transistor, and a signal and control device operated by said relay switch, said control device including a switch means in said alternating current electrical power line to open said power line during periods of over-voltage condition on said power line.

References Cited by the Examiner

UNITED STATES PATENTS

| | | | |
|---|---|---|---|
| 3,005,932 | 10/1961 | Soares | 317—38 X |
| 3,119,951 | 1/1964 | Davy | 317—13 |
| 3,132,287 | 5/1964 | Yarbrough | 317—33 |
| 3,155,880 | 11/1964 | Salina | 317—31 X |
| 3,160,786 | 12/1964 | Faglie | 317—31 X |

SAMUEL BERNSTEIN, *Primary Examiner.*

J. D. TRAMMELL, *Assistant Examiner.*

Disclaimer 3,243,658.—*Alan B. Blackburn*, Troy, Ohio. ELECTRONIC VOLTAGE DETECTION AND PROTECTION DEVICE. Patent dated Mar. 29, 1966. Disclaimer filed June 11, 1968, by the assignee, *Hobart Brothers Company*.

Hereby enters this disclaimer to claims 3, 4 and 5 of said patent.

[*Official Gazette November 19, 1968.*]